United States Patent Office 3,695,906
Patented Oct. 3, 1972

3,695,906
CONCRETE HARDENING METHOD
AND COMPOSITION
Ray F. McCune, 1710 Alta Vista Drive, Alhambra, Calif. 91803, and Richard C. Porter, 310 S. 3rd E., Preston, Idaho 83263
No Drawing. Filed May 28, 1971, Ser. No. 148,215
Int. Cl. C09k 3/100
U.S. Cl. 106—12                    3 Claims

ABSTRACT OF THE DISCLOSURE

Uncured cement-containing material is treated by the method:
(a) preparing a dilute aqueous solution containing sodium silicate, an alkali fluoride, and hydrofluoric acid, and
(b) applying said solution to the surface of said uncured material,
(c) the amounts of said silicate, alkali fluoride and hydrofluoric acid being such that hardening of the material during curing is enhanced.

BACKGROUND OF THE INVENTION

This invention relates generally to processes for treating calcareous products such as concrete, stucco, and plaster. More specifically, it concerns the use of sodium silicate to promote the waterproofing, curing, hardening and sealing of such products.

Various types of materials have been used in the past to help waterproof, cure, harden, and/or seal products using a portland cement base. Portland cements of different grades and types are used in many concretes, concrete block, plasters, and stuccos. In and of itself, cement is limited in its ability to resist water and acids. For example, portland cement will produce a product that is limited in its hardness, water resistance, and its ability to properly seal and cure, such limitations being greatly dependent on the amount of cement being used. Consequently, in most cases, an additive is needed for the product to reach the desired requirements.

Many of the various cement-containing products on the market today include additive materials foreign to concretes, stuccos, and plasters. It is believed that the best results can only be obtained by using additives that are common to the product that is to be treated. For example: water and silicates are materials common to cement containing products increasing the product bulk; whereas oil is not a material common to cements and its use can cause problems. Silicates in varying solutions have been used in treating cement-containing products with only limited success, many silicate solutions providing only a two to three year longevity. This is generally due to the fact that an ion exchange does not take place to make the silicate insoluble or stable. The lack of an ion exchange causes a loss of effectiveness and quality.

SUMMARY OF THE INVENTION

It is a major object of the invention to provide compositions and method of application thereof capable of enhancing the waterproofing, curing, hardening and sealing of cement-containing products such as concrete, stucco, and plaster, the "cement" typically comprising portland cement.

As regards treatment of an uncured calcareous cement (as for example portland cement) containing material as referred to, the method basically comprises: preparing a dilute aqueous solution containing sodium silicate, an alkali fluoride, and hydrofluoric acid; and, applying the solution to the surface of the uncured material, the amounts of the silicate fluoride and acid being such that hardening of the cementitious material is enhanced. Also, waterproofing, sealing and curing of the material are significantly enhanced.

The method of preparing the product solution comprises:
(a) Dissolving the alkali fluoride in a first quantity of warm water to form a first solution,
(b) Combining the first solution with a second quantity of cold water greatly in excess of said first quantity of water to form a second solution,
(c) Combining the acid with a third quantity of cool water to form a third solution, and
(d) Combining the second and third solutions with the sodium silicate to form the product solution.

Finally, the invention also includes the solution product produced by the above method, as well as methods to be described.

DESCRIPTION OF PREFERRED EMBODIMENT

In accordance with the invention, a dilute aqueous product solution is prepared by dissolving an alkali fluoride (as for example sodium bi-fluoride) in a first quantity of warm water to form a first solution; the first solution is combined with a second quantity of cold water greatly in excess of the first quantity of warm water to form a second solution; hydrofluoric acid in about the same amount as the fluoride is dissolved in a quantity of cool water about the same as the first quantity of warm water to form a third solution; and the second and third solutions are combined with a quantity of sodium silicate to form the product solution. In this regard, the amount of silicate may vary between 40% to 70% of the product solution by volume. Such silicate may, for example, have a weight ratio of $SiO_2$ to $NaO_2$ of about 3.22. This silicate may be in water glass form, wherein the amount of water may be about 62% by weight of the solution. Products N, G or O of Philadelphia Quartz Company, Philadelphia, Pennsylvania are representative. Typically, the product solution will contain about .25 ounce of sodium bi-fluoride per gallon of solution, and about .25 ounce of hydrofluoric acid per gallon of solution.

The product solution is thus applied (as for example by spraying) onto the drying surface of the uncured cementitious material (concrete, stucco, plaster, etc.) to wet it and for absorption into the body of the cementitious material during curing thereof. For example, the product solution is applied to poured concrete just after the water sheen leaves the surface, i.e. a few minutes after pouring of the concrete. Enough solution is applied so that the surface will be wetted, to the point of puddling; i.e. between 500 ft.² and 150 ft.² of surface may be wetted with one gallon of solution (the greater the concrete porosity the more product solution is used).

As a result, hardening of the cementitious material is promoted, the applied solution acting as a catalyst to cause formation of many more silicate-calcium bonds by ion exchange. Also, sealing, waterproofing and curing are promoted. As regards the latter, a "quick set" is induced, although full cure of the mass will require the normal cure time, as for example about 28 days for concrete. Abrasion resistance of the material at its surface is also enhanced due to water glass content of the catalyst solution. It is believed that the favorable results are in large part to action of the fluoride concentration to disrupt oxygen-calcium bonds in the cementitious material, tending to soften same, the silicate then replacing the disrupted bonds to form a permanent silicate bond with the calcium.

Examples of product solution formation are as follows:

EXAMPLE 1

A first solution was prepared by slowing adding 14 ounces of sodium bi-fluoride to one gallon of warm water at between 135 and 140 degrees F. Mixing was continued for about five minutes to completely dissolve the sodium bifluoride in the water.

A second solution was prepared by slowly adding the first solution to 28 gallons of cold water. After such addition, mixing was continued for about five minutes, as by pumping.

A third solution was prepared by slowly adding 14 ounces of hydrofluoric acid (70%) to one gallon of cold water, with light agitation.

The second and third solutions were then slowly combined, with circulation as by pumping forming a fourth solution. Twenty-four and one one-half gallons of sodium silicate was then combined with the fourth solution, as by pumping. Mixing was carried out for about 5–10 minutes, producing 55 gallons of product.

EXAMPLE 2

A first solution was prepared in Example 1.

A second solution was prepared as in Example 1, excepting that only 15½ gallons of water were used.

A third solution was prepared as in Example 1.

The second and third solutions were then slowly combined forming a fourth solution with circulation in the same container as by pumping. Thirty-seven gallons of sodium silicate was then combined with the fourth solution. Mixing was continued for 5–10 minutes, producing 55 gallons of product.

Because of the amount of silicates in the formulation, the reaction that takes place causes many more silicate bonds to form with the soluble calcium. A growth, similar to a salt growth, is stated and continues until all the soluble calcium has reacted with the available silicates. However, unlike salt growth, the silicates and calcium bonds stabilize. By increasing these bonds, a much tighter cement matrix is formed, to prevent water and foreign material from penetrating the surface. Moisture is the key in forming the desired bonds and over a period of time as more moisture is brought in contact with the surface, more and more of such bonds will form, which will truly waterproof the product.

Using the above formulation one may cure concrete products using cement and aggregate of wide variety, including those of a synthetic foam type. In curing, a reaction with the soluble calcium found in cement takes place. A surface gel is formed as Example 1 solution reacts with the cement, holding the needed moisture in the concrete product to cure it properly. The bonds that grow are of a glass-like nature, the sodium silicate causing the concrete matrix to become harder as the bonding takes place. The structural strength of the mass is also enhanced.

Concrete products may also be made resistant to all but the most concentrated acids. In so treating such products for acid resistance a new applicaiton of solution must be used. For example, apply Example 1 solution diluted in water (one part solution to four parts water) to the material. Next, apply a second solution of one part Example 1 solution to three parts water. Thirdly, apply another solution of one part Example 1 solution to two parts water. Fourthly, apply straight Example 1 solution to the surface of the treated material. Enough time must be allowed to permit each coat to dry before the next is applied. Since the formulations first react with the surface and then penetrate, dusting does not become a problem.

The solution product can also be used on old concrete surfaces to enable bonding of new concrete to them. First, the surface must be treated to be freed of oil, dirt, and grime. A conventional acid wash may be necessary. After the surface is clean, spray on Example 1 solution just before pouring of new cement. The Example 1 solution should not be dry at this time, nor should there be any wet surfaces where puddles are forming, i.e. the surface should be damp only.

If stucco is applied to a surface and dries too fast, a condition called "mottling" occurs. Mottling is uneven drying which affects colors in stucco. This will appear as if the stucco is fading in odd, small patterns. However, if Example 1 solution is applied in the cure cycle, mottling will not take place.

Burnt out plaster or stucco is also an industry problem, burning out being a condition wherein heat and wind have dried the product too fast, not allowing it make proper bonds with the calcium and silicate. Application of Example 1 solution will greatly increase the bonds and will cause the product to cure properly. Moreover, the application of that solution after burning out has happened will reverse the appearance and will improve the plaster and stucco appearances.

Cracking is also a problem that the formulations can help cure because of the added bonds and strength that are produced during the cure.

It has been observed that surfaces treated as described clean very easily. Oily products will not cling to the surfaces, and silage and related products and bi-products will easily wash off such walls. A light brushing will cause most impregnated materials to wash off.

Example 1 solution can be used in restoring clay brick surfaces where a portland cement mortar has been used. In some areas and over a period of time these mortars will be gin to crumble. Both of the surfaces, mortar and brick, can be benefited using Example 1 solution. The mortar will be strengthened and the brick surafces will be more thoroughly waterproofed.

We claim:

1. The method of promoting hardening of an uncured cement containing material selected from the group consisting of concrete, stucco and plaster, that includes:

(a) preparing an aqueous solution containing between 40% and 70% by volume of sodium silicate having a weight ratio of $SiO_2$ to $NaO_2$ of about 3.22, (an alkali fluoride) about .25 ounce of sodium bi-fluoride per gallon of solution, and .25 ounce of hydrofluoric acid having a concentration of about 70% per gallon of solution, and (b) applying said solution to the surface of said uncured material, (c) the amounts of said sodium silicate, sodium bi-fluoride and hydrofluoric acid being such that hardening of the material during curing is enhanced.

2. The method of preparing an aqueous product solution containing sodium silicate, an alkali fluoride and hydrofluoric acid, said product solution suitable for application to the surface of uncured cement containing material to promote hardening thereof, said material selected from the group consisting of concrete, stucco and plaster, said method comprising:

(a) dissolving sodium bi-fluoride in a first quantity of warm water to form a first solution, (b) combining the first solution with a second quantity of cold water greatly in excess of said first quantity of water to form a second solution, (c) combining hydrofluoric acid having a concentration of about 70% with a third quantity of cool water to form a third solution, and (d) combining the second and third solution with a sodium silicate having a weight ratio of $SiO_2$ to $NaO_2$ of about 3.22 to form a product solution containing 40% to 70% by volume of sodium silicate, .25 ounce of sodium bi-fluoride per gallon of solution, and .25 ounce of hydrofluoric acid per gallon of solution.

3. A product aqueous solution containing about 40% to 70% sodium silicate, by volume; about .25 ounce of sodium bi-fluoride per gallon of solution; about .25 ounce of hydrofluoric acid per gallon of solution; and the balance of the solution consisting of water, the silicate having a weight ratio of $SiO_2$ to $NaO_2$ of about 3.22, and the original acid concentration having been about 70%.

References Cited

FOREIGN PATENTS

| 271,203 | 5/1967 | Great Britain | 106—12 |
| 497,522 | 12/1938 | Great Britain | 106—12 |

JOAN B. EVANS, Primary Examiner

U.S. Cl. X.R.

106—74, 315

UNITED STATES PATENT OFFICE
CERTIFICATE OF CORRECTION

Patent No. 3,695,906     Dated October 3, 1972

Inventor(s)    Ray F. McCune and Richard C. Porter

It is certified that error appears in the above-identified patent and that said Letters Patent are hereby corrected as shown below:

Column 4, delete lines 53-57, in toto, and substitute

-- weight ratio of $SiO_2$ to $NaO_2$ of about 3.22, about .25 ounce of sodium bi-fluoride per gallon of solution, and about .25 ounce of hydrofluoric acid per gallon of solution, the original acid concentration having been about 70%, and --

Column 5, delete lines 4-9, in toto, and substitute

-- (d) combining the second and third solutions with a sodium silicate having a weight ratio of $SiO_2$ to $NaO_2$ of about 3.22 to form a product solution containing 40% to 70% by volume of sodium silicate, about .25 ounce of sodium bi-fluoride per gallon of solution, and about .25 ounce of hydrofluoric acid per gallon of solution. --

Signed and sealed this 29th day of May 1973.

(SEAL)
Attest:

EDWARD M. FLETCHER, JR.
Attesting Officer

ROBERT GOTTSCHALK
Commissioner of Patents